(12) United States Patent
Fishler (10) Patent No.: US 6,507,646 B1
(45) Date of Patent: Jan. 14, 2003

(54) APPARATUS AND METHOD FOR CALL-WAITING EVENT INTERCEPTION

(75) Inventor: Eayl Fishler, Ginot Shomron (IL)

(73) Assignee: Tersync Ltc., Tel Aviv (IL)

( * ) Notice: Subject to any disclaimer, the term of this patent is extended or adjusted under 35 U.S.C. 154(b) by 0 days.

(21) Appl. No.: 09/499,286

(22) Filed: Feb. 7, 2000

(51) Int. Cl.[7] .......................... H04L 12/16; H04L 12/66; H04M 3/20; H04M 3/42; H04M 11/06
(52) U.S. Cl. ................... 379/215.01; 370/259; 370/352; 379/93.35; 379/142.08
(58) Field of Search ................................. 370/259, 352; 379/93.35, 142.08, 215.01; 455/414

(56) References Cited

U.S. PATENT DOCUMENTS

| | | | |
|---|---|---|---|
| 4,852,151 A | 7/1989 | Dittakavi et al. | 379/93.35 |
| 5,513,251 A | 4/1996 | Rochkind et al. | 379/93.35 |
| 5,519,767 A | 5/1996 | O'Horo et al. | 379/93.35 X |
| 5,651,060 A | 7/1997 | Cohn | 379/215.01 |
| 5,805,587 A | 9/1998 | Norris et al. | 370/352 |
| 5,809,128 A | 9/1998 | McMullin | 379/215.01 |
| 5,940,489 A | 8/1999 | Cohn et al. | 379/215.01 |
| 5,982,774 A * | 11/1999 | Foladare et al. | 370/352 |
| 6,097,795 A * | 8/2000 | Ungruh et al. | 379/215.01 |
| 6,104,800 A * | 8/2000 | Benson | 379/215.01 |
| 6,169,796 B1 * | 1/2001 | Bauer et al. | 370/352 |
| 6,219,413 B1 * | 4/2001 | Burg | 370/352 |
| 6,317,488 B1 * | 11/2001 | DePond et al. | 379/142.08 |

* cited by examiner

Primary Examiner—Harry S. Hong
(74) Attorney, Agent, or Firm—Hogan & Hartson LLP (57) ABSTRACT

A communication device connecting a computer to a data-network correctly recognizes a telecommunication company call-waiting signal, and notifies a user regarding the attempted call. The user is allowed to handle the call-waiting event by performing a sequence of predefined alternative actions in a flexible manner that correspond to the known options supplied by the telecommunication company in respect to the call-waiting event.

30 Claims, 7 Drawing Sheets

**CALL WAITING EVENT
INTERCEPTION COMPONENT**

FIG. 4

DATA FLOW MONITORING

FIG. 5

COMMUNICATION STATUS TEST

APPARATUS AND METHOD FOR CALL-WAITING EVENT INTERCEPTION

BACKGROUND OF THE INVENTION

1. Field of the Invention

The present invention relates generally to a call-waiting interception feature for a communication device connecting a computer to a conventional data-network, and more particularly, to a method for responding to a telecommunication company call-waiting signal by alerting a user when an incoming call is attempted.

2. Discussion of the Relevant Art

A modem is a device that allows both voice and data communications to be transmitted over a single telephone line. A computer that transmits and receives data via the modem, and the telephone line connected therewith, can be used to access various data and services that are available on a data-network. Computers are used to connect to computer networks, such as the Internet, for various purposes. One such purpose may be for receiving or sending electronic mail. Another is for viewing information available to the user. Typically, connection times are long. Sometimes a situation arises wherein an incoming call occurs, while the telephone line is in use in connection with computer access to the Internet.

Call waiting is a feature supplied by telephone companies and implemented by automatic telephone-switching devices. The feature alerts a telephone user of another incoming call from a third party while the user is already engaged in an ongoing call with a second party. Call notification is provided to the user by an audible indication such as a short tone, on the voice channel thereof.

Telephone companies offering call-waiting services provide means by which a person already conducting a telephone call can put on hold the person he is talking to thereby switching to a conversation with another person calling.

After being notified of the call-waiting, the user has a number of options. By virtue of the above-mentioned means the user can interrupt the ongoing call, put the first call on hold and switch to the second call by flashing the hook switch. The party on hold is in idle state at this time. When the user finishes the conversation with the third party, the user flashes the hook switch again to switch back to the original connection.

The user can also take the pending call by hanging up the ongoing call. Following hanging up the ongoing call the telephone will immediately ring due to the incoming call.

The user could also ignore the call-waiting signal and proceed with the ongoing call. In such case, the call-waiting notification will be repeated at least one more time.

Typically, when a modem is used, i.e., the user is connected to a data-network via a modem and a telephone line, the call-waiting feature is lost because the modem is not adapted to respond to the call-waiting signal. In such circumstances, the user will not be aware of the second incoming call.

Call-waiting notification is a disruption of the carrier in the modem. A carrier is a transmitted electromagnetic pulse or wave at a steady base frequency of alternation on which information can be imposed by increasing signal length, varying the base frequency, varying the wave phase, or other means.

All modems consist of a digital part and an analog part. The analog part is connected to the telephone line and is designed to handle incoming wave variations over the telephone line representing voice or data indications. The analog side of the modem is translated to digital indications using conventional (ADC) analog-to-digital converter unit. ADC conversion is an electronic process in which a continuously variable (analog) signal is changed, without altering its essential content, into a multi-level (digital) signal. The characteristics of the incoming variable (analog) signal associated with the notification tone are out of the range of admissible signal variations for data indications. Therefore, the notification by tone of the call-waiting feature cannot be transferred from the analog part to the digital part, without causing actual disconnection of the modem from the telephone line.

Thus, there is a need for a method of identifying the call-waiting feature while the user is connected via a modem to a telephone line.

Several solutions have been proposed to the described problem in the art. Some of the proposed solutions identify the call-waiting signal by using a specially designed modem having the capability to identify the particular attributes of the call-waiting signal analog waveform. Such modems are mechanically altered to achieve said purpose. Therefore said specially designed modem could recognize and consequently handle said signal in association with specifically developed software program.

Other solutions offer a connection to the public switched telephone network (PSTN) thereby to identify the call-waiting signal and then pass the information to the user over the data-network.

Yet another proposed solution involves a simulation of the call-waiting feature by using the call-forward feature. Before connecting to the data-network the user computer exercises the call-forward feature, i.e., dialing 72 or *72 and then a server service telephone number. When a second call is received, the PSTN transfers the second call to the Internet Service Provider (ISP), which notifies the user via the data-network of the incoming call. The dial-up number used for activating the call-forward feature is telephone network-specific. After the termination of the call, it is necessary to cancel the call-forward service by placing another call. It will be appreciated that it would be highly desirable to have a comprehensive solution for the correct recognition and appropriate handling of the call-waiting event. It would also be advantageous to have a solution that comprises software elements implemented on the user computer that applies to all standard modems using AT commands and necessitates no hardware modifications in the modem, the telephony or the Internet Service Provider (ISP).

SUMMARY OF THE PRESENT INVENTION

One aspect of the present invention regards a computerized system that includes a storage device, a communication device, an input/output device and a processing device, wherein a call waiting event interception apparatus operatively loaded into the storage device includes a call waiting event interception component for identifying a call waiting component and a call waiting event handling component.

A second aspect of the present invention regards a computerized system that includes a storage device, a communication device, an input/output device and a processing device, wherein a call waiting event apparatus operatively loaded into the storage device includes a call waiting interception method. The call waiting interception method includes a method for initializing a communication device, a method for measuring round trip time of a data unit from the data network to the computerized system, a method for identifying a call waiting event and a method for responding to a call waiting event.

The first aspect of the present invention provides a novel device for intercepting call waiting events, which overcomes the disadvantages of the prior art.

The second aspect of the present invention provides a novel method for intercepting and properly handling call waiting events, which overcome the disadvantages of the prior art.

BRIEF DESCRIPTION OF THE DRAWINGS

In the drawings, closely related figures have the same number but different alphabetic suffixes.

The present invention will be understood and appreciated more fully from the following detailed description taken in conjunction with the drawings in which.

DETAILED DESCRIPTION OF THE PREFERRED EMBODIMENT

The present invention overcomes the disadvantages of the prior art by providing a novel method, that will intercept a call-waiting event in a standard modem operatively connecting a computer to a conventional data-network over a telephone line.

The present invention provides a mechanism, which associates a call-waiting event with two operating factors in the telecommunication environment: the state of the data flow between the computer and the data network and the status of the communication. When said mechanism detects the appropriate states of the respective operating factors in a manner that will be explained hereunder, it is concluded that a call-waiting event is taking place. Therefore, the user is provided with a call-waiting notification. Responding to the user's instructions, alternatively predefined sequences of operations are selectably performed.

Figure 1:
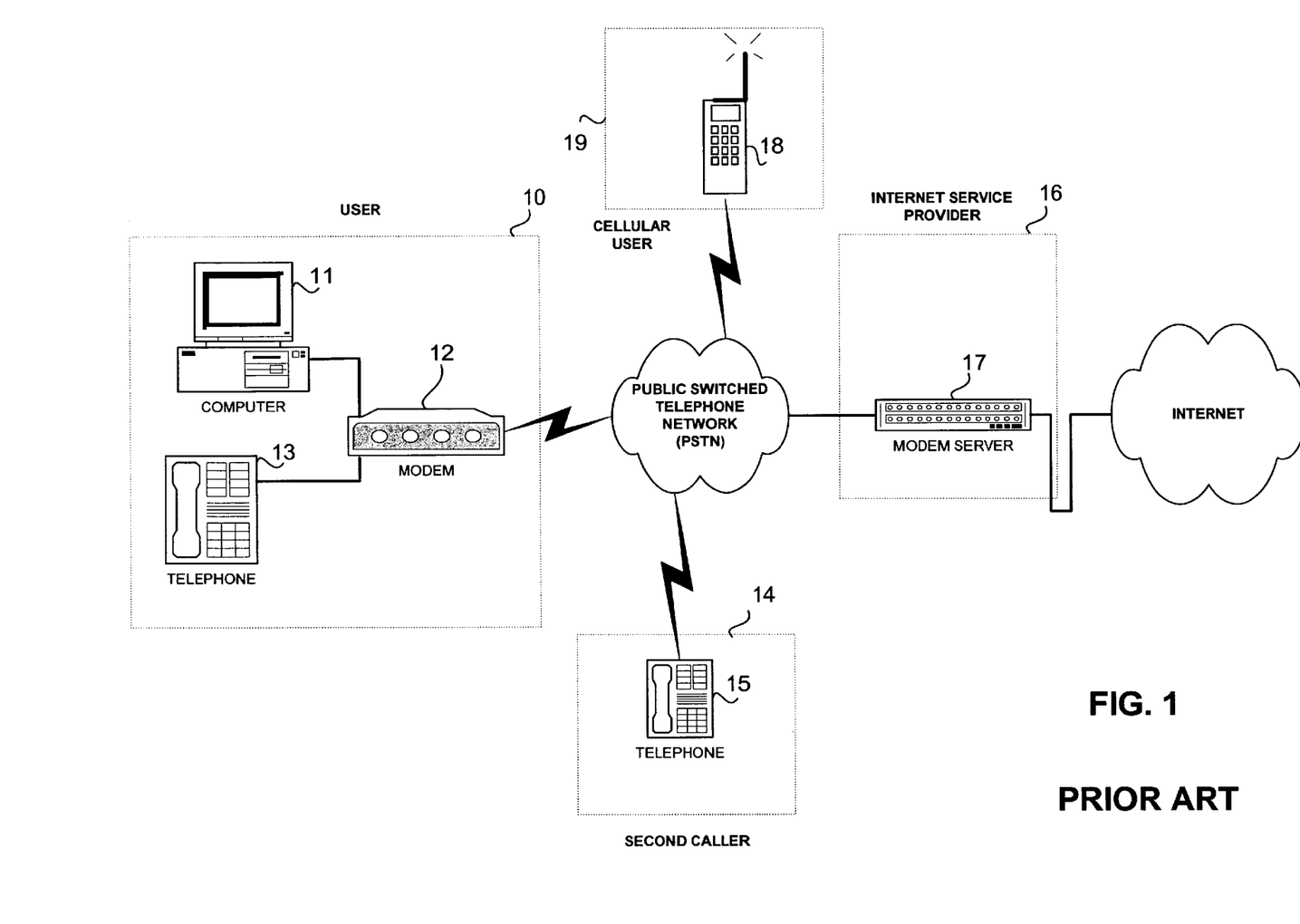
FIG. 1 is a schematic block diagram illustrating the prior art components and telecommunications network in which the principles of the invention may be practiced.

Reference is now made to FIG. 1, which is a schematic block diagram illustrating the prior art components and the data-network in which the principles of the invention may be practiced in accordance with a preferred embodiment of the invention.

The prior art components in combination with the telephone network and the data network illustrate a simplified telecommunication environment for the purpose of explanation not limitation. Said environment comprises a user 10, a second caller 14, an Internet Service Provider (ISP) 16, a Public Switched Telephone Network (PSTN) and the Internet Network. Said user may be using a communication device, such as a cellular telephone 18 or personal data assistance, and the like. It will be appreciated that other communication devices including computing ability concurrently with communication abilities and are therefore contemplated as part of the present invention. Communication lines link all the elements in the simplified telecommunication environment.

An Internet Service Provider (ISP) is a company that provides individuals and other companies access to the Internet and other related services such as electronic mail. An ISP has the equipment and the telecommunication line access required to have point-to-point presence on the Internet for the geographic area served. A Public Switched Telephone Network (PSTN) refers to the world's collection of interconnected voice-oriented public telephone networks, both commercial and government-owned. Said PSTN may include connection to cellular or other voice or data networks able to carry voice or data over communications lines.

The user 10 comprises a computer 11, a modem device 12, and a telephone apparatus 13. Alternatively, the user 19 may be carrying a cellular device 18 comprising a personal computer a communication device and a telephone apparatus. It is noted that the modem device and the telephone device represent a communication device able to send and receive voice or data over communication lines, and that the present invention is not limited to any specific communication device. Computer 11 could be linked to modem 12 via an RS-232-C line and telephone 13 is linked to modem 12 via a telephone line. RS-232-C is a standard that describes the physical interface and protocol for data communication between computers and related devices. The RS-232-C interface enables a computer to exchange data with a modem or other serial devices.

Typically, RS-232-C is used by external modems only. In contrast, internal modems are commonly linked to a computer via the PCI (Peripheral Component Interface) bridge. PCI is a standard for connecting peripherals to a personal computer designed by Intel Corp. and used for example in systems based on Pentium, Pentium Pro and DEC Alpha processors. Other interfaces able to link computer devices and communication devices or lines are also contemplated by the present invention.

Modem 12 is connected via a telephone line to the PSTN. The modem server 17 of the ISP 16 is connected via telephone lines both to the PSTN and to the Internet. Second caller 14 has a telephone apparatus 15. The telephone 15 is also connected via a telephone line to the PSTN. In an alternative embodiment, second user 14 may use a cellular communication device 18. In yet another alternative embodiment user 10 may use computer 11 and a communication device 12 not having a telephone device 13 present.

In the illustrated embodiment, when the user instructs computer 11 to establish connection to the Internet, computer 11 sends a command to modem 12 to dial to modem 17 of ISP 16. Modem 12 establishes communication with modem 17 via the PSTN and modem 17 in turn hooks up modem 12 to the Internet. Therefore computer 11 is operatively connected to the Internet and a communication of data transfer is in progress.

Ordinarily, if during the ongoing connection second user 14 attempts to dial to user 10 the following happens. Telephone 15 connects to the PSTN, which tries to link telephone 15 to the line of user 10. As the line is busy the PSTN activates the call-waiting feature, if available, and signal telephone 13 that an another call is waiting. Because telephone 13 is hooked and used by modem 12, said call-waiting is relayed to modem 12. The call-waiting event signal transferred to modem 12 causes loss of the signal carrier and shortly afterwards the reception of an audible tone. Modem 12 interprets the loss of signal carrier as a disturbance on the line. Some modern modems incorporate an automatic hang-up feature. If modem 12 has said feature, then following the loss of carrier signal modem 12 terminates the connection by hanging up telephone 13. Other modems now available may detect loss of the signal carrier and instruct modem 12 to attempt re-synchronization.

Figure 2:
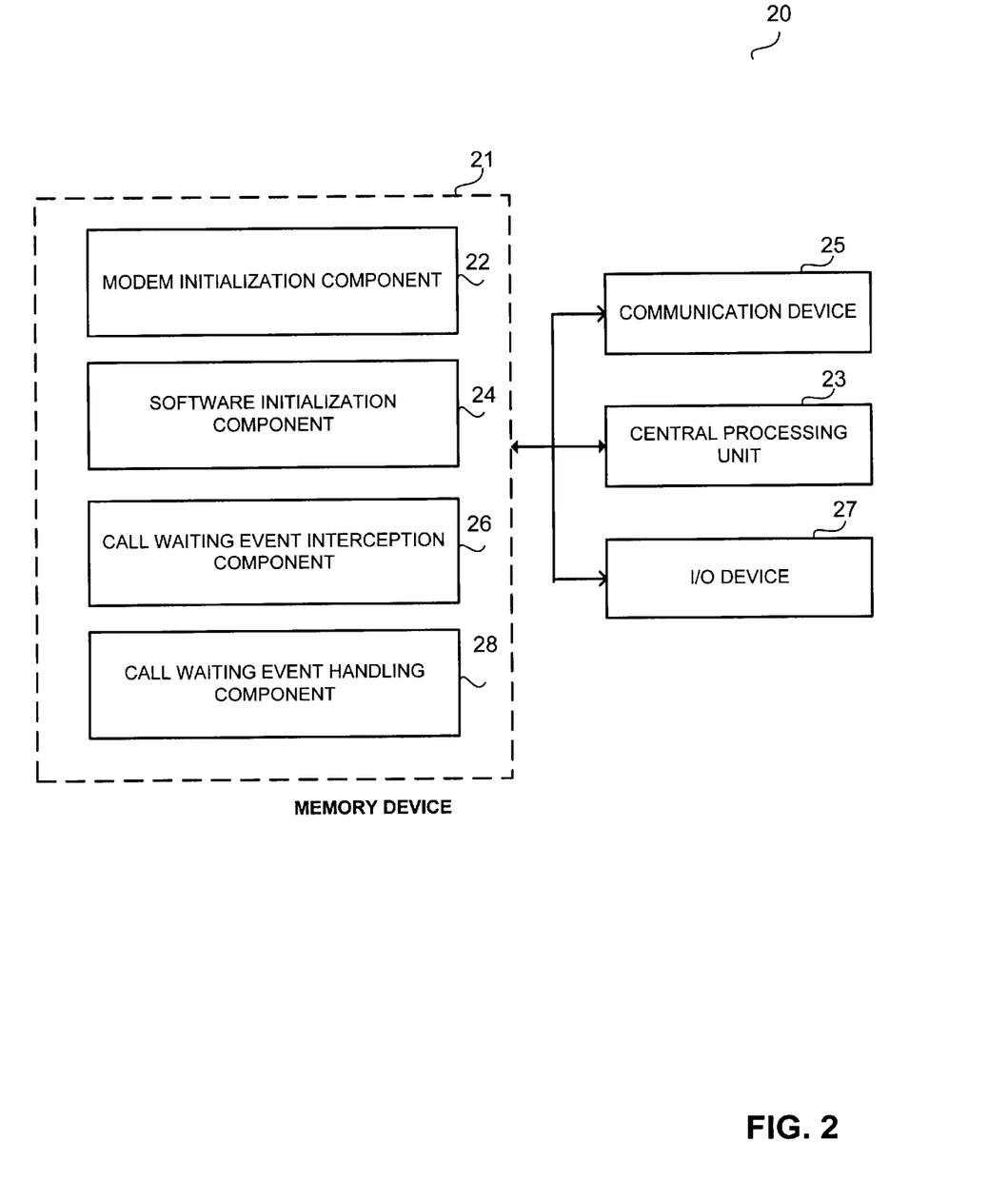
FIG. 2 is a block diagram showing the Call-waiting Event Interception apparatus, operating within a memory device of a computer system in accordance with the preferred embodiment of the present invention.

The objective of the present invention is to improve upon the above-described process by configuring modem 12 to detect a call-waiting event while communication of data takes place. Another objective of the present invention is to prevent modem 12 from hanging up due to loss of a carrier signal. Yet another objective of the present invention is to notify the user that a call-waiting event has been identified and to enable the user to exercise the options provided with respect to the call-waiting event. Turning now to FIG. 2 showing the Call-waiting Event Interception apparatus operating within a memory device of a computer system in accordance with the preferred embodiment of the present invention.

The Call-waiting Event Interception (CWEI as will be referred to from this point on in the text of this document) is operative within a computer system memory having a Memory Device 21, a Central Processing Unit (CPU) 23, a Communication Device 25, and an Input/Output Device (I/O), such as a display and a keyboard 27, or a keypad or the like.

The CWEI apparatus is operatively loaded into Memory Device 21 of a personal computer as part of a modem dial up program, such as Microsoft Dial Up Adapter produced and manufactured by Microsoft Corporation, Redmond, Wash. USA. Alternatively, the user, according to various predetermined and predefined circumstances may load CWEI into memory device 21 of a personal computer, a cellular telephone, personal data assistance such as Palm Pilot and the like. It will be further appreciated that the ICWEI may be installed and operated in any system implementing a communication device.

Memory Device 21 comprises a modem initialization component 22, a software initialization component 24, a call-waiting event interception component 26 and a call-waiting event handling component 28. The functions of the above-listed components will be explained next.

Modem initialization component 22 is applied before connection to the ISP 16 is attempted. Modem initialization component 22 function consists of resetting hardware related values that control modem 12 behavior during a loss of the signal carrier, degradation in the quality of the telephone line or the reception of a call-waiting signal. Modem initialization component 22 prevents the modem from hanging up prematurely and prevents computer 11 communication software from initiating re-dialing in the above-described circumstances.

Software initialization component 24 is activated after connection has been established with the ISP. Software initialization component 24 function is to find the average Round Trip Time value from a data network packet. Round Trip Time is a value indicating the duration necessary for a packet transmitted from a computer to arrive to the data network and return to said computer. Said value used in association with Call-waiting Event Interception Component 26 communication status testing module. The operation of said component and said module would be described hereunder with the following drawings.

Call-waiting Event Interception (CWEI) Component 26 function is to identify a call-waiting event during a communication of data transfer. CWEI component 26 continuously monitors the state of the data stream flowing between the modem and the computer. According to the result of said monitoring, CWEI component 26 checks the status of the communication. The detailed description of the operation of CWEI Component 26 will be described hereunder in association with the following drawings.

Call Waiting Event Handling (CWEH) Component 28 interfaces with the user in the time frame of call-waiting event handling. CWEH Component 28 notifies the user in regard to the call-waiting event and takes appropriate actions according to the user's preferences relating to the options associated with the call-waiting feature. Alternatively CWEH may operate automatically in accordance with user predetermined values so as to automatically handle the response to a call-waiting event. The detailed descriptions of the user's possible actions will be presented hereunder with the following drawings.

The descriptions of the preferred embodiment of the present invention hereunder include some specific technical terms. Although these terms are well known in the art, a short reminder is in order, so that the following descriptions will make the present invention objectives manifest to one who is skilled in the art.

Figure 3A:
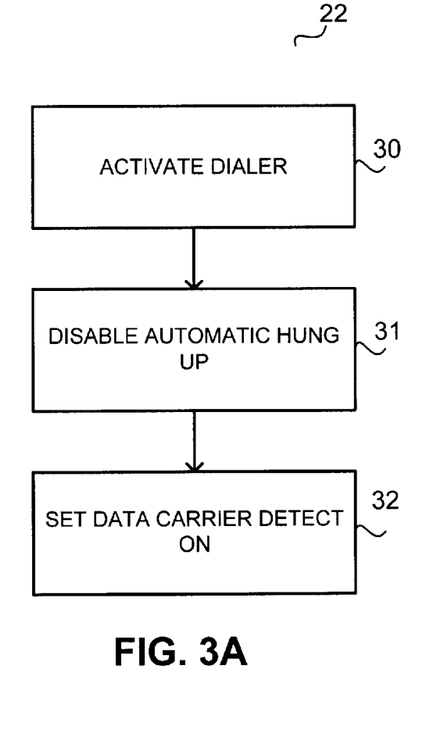
FIG. 3A is a high level flowchart showing the method for initializing the modem.

Turning now to FIG. 3A there is shown the operation of the modem initializer component 22 in FIG. 2. The operation of said component is as follows.

In accordance with a preferred embodiment of the present invention, modem initializer component 22 activates the dialer at block 30. A register is one of a set of data holding spaces in the memory of a computer microprocessor. Depending on the processor design registers may be numbered or have arbitrary names. In a standard modem the set of registers are called S-registers (standing for "Standard-registers"). S-registers affect various operational characteristics of the modem. Each register has a factory-set value, which can be read or changed. The S-registers also have a range of permissible values. The communication software of the modem uses as instructions the so-called "AT commands." All the AT commands (except "A/") are prefixed by the letters "AT" (standing for "Attention"). To set a value of an S-register, the command "ATSx" is used when "x" is the designated number of the S-register.

Adoptive line equalization is performed by modems through measuring the communication line responses to certain frequencies of the signal carrier. According to the results received the modems amplify some frequencies, lower other frequencies and avoid the use of certain frequencies.

Modems in the process of communication continuously monitor the transmission line between them: the quality of signals they get, the number of errors corrected and the validity of data on each of the carriers. When modems observe excessive problems, a re-evaluation of the line is performed by interruption of the signal carriers and adoptive line equalization. The above-described procedure is called retraining. Retraining may occur at any time in the course of the transmission. When a modem loses the signal carrier, it will attempt to retrain until automatic hang-up is applied or until some other external interruption occurs.

At step 31 a computer command is issued to the modem to set the time interval to automatic hang-up in the modem to a sufficiently high value. In a preferred embodiment of the invention an AT command "ATS10=255" is sent to the modem. Said AT command sets the value of S-register 10 to about 255. S-register 10 is a member of the standard set of registers in modems using AT commands. Said value is the upper limit of the range of possible values S-register 10 can hold. S-register 10 is defined as "holding the time waited after the loss remote carrier before the modem ceases the attempts to retrain." Practically, it means the time between the loss of carrier and the modem hanging up automatically. Setting S-register 10 to the highest possible value will disable the mechanism of the countdown that usually begins when losing a carrier. By virtue of S-register 10 holding 255, modem 12 after losing the signal carrier will try to retrain until some external interruption occurs. At step 32, a computer command is issued to the modem to set Data Carrier Detect to the "ON" position. Data Carrier Detect is a control signal between a modem and a computer indicating that the modem detected a valid carrier used for sending or receiving information.

In the preferred embodiment of the invention, the AT command "AT & C0" is sent to modem 12. Said command sets the Data Carrier Detect control signal permanently to the "ON" state on pin 8 of the RS-232-C interface. The signal will indicate to computer 11 that modem 12 is receiving a valid signal carrier from remote modem 17. Therefore, computer 11 will not be aware when a loss of the signal carrier occurs.

Figure 3B:
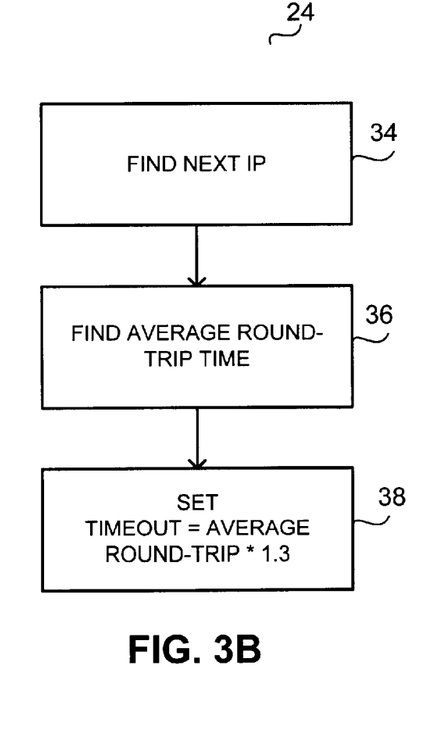
FIG. 3B is a high level flowchart showing the method for the initializing the software.

Turning now to FIG. 3B there in shown the operation of the software initializer component 24 in FIG. 2. The operation of said component is as follows.

A network control program is utilized to set a router as a reference point on the network in order to obtain the average time needed for a computer message to complete a round trip between modem 12 of user 10 and the referenced router.

In a preferred embodiment of the invention, software initializer 24 sends an Internet Control Message Protocol (ICMP) message. Internet Control Message Protocol (ICMP) is a message control and error reporting protocol between a host computer and a gateway computer to the Internet. ICMP messages, delivered in Internet Protocol packets, are used for out-band messages related to network control operations. A Traceroute network utility message is sent with a Time to Live (TTL) value set to two. TTL is an IP header field that is designed to prevent packets from running in loops across a network. Every router that handles a packet subtracts one from the packet's TTL. When TTL reaches zero, the packet has expired and discarded. Tracerout utility depends on the common router practice of sending ICMP Time Exceeded message back to the sender when a packet is expired. ICMP Time Exceeded message contains the sending router network address.

At step 34, a Traceroute packet is sent through server system 16 with a TTL value of 2. The next router that is in the path of the packet following server system 16 sets TTL to zero, drops the packet and returns an IP address. The address is saved, to be used in the following steps as the address of the referenced router in order to calculate the Average Round Trip Time.

In a preferred embodiment of the invention, software initializer 24 sends an Internet Control Message Protocol (ICMP) message utilizing the saved address of the referenced router, using the Ping function to find the average Round Trip Time at step 36. ICMP supports an Echo function, which sends an IP packet on a round-trip between two hosts. Ping, a common network management tool, is based on this feature. Ping can be used with a host that is operating, to obtain the response-time of an IP packet sent and returned. Ping will transmit a series of IP packets, measuring average round-trip times i.e., the average time needed for the IP packets the complete a round-trip through the communication line between two hosts.

The size of the IP packet sent is computed as 13% of the transmission rate. For example with a transmission rate of 33.6 Kbit the packet size will be 548 bytes. The range of possible values across which said value could be effective in accordance with the preferred embodiment of the invention is 10%–25%.

When used in association with the Microsoft operating systems, ICMP is only applicable in WINSOCK2. Therefore, it will be appreciated by those skilled in the art that various data network may use various similar means for sending and receiving packets to determine round trip time between two hosts on said network. For example the command equivalent to Ping in a DEC (Digital Equipment Corp.) protocol is: MC NCP LOOP NODE Y.XXX COUNT ZZZ, where Y.XXX represents the address of the computer and ZZZZ is the packet size in bytes. By using the above-described feature, software initializer 24 receives at step 36 the value of the average Round Trip Time from the Ping function. At step 38, a timeout value is set to the value of Average Round Trip Time multiplied by the value of about 1.3. The range of possible values across which said timeout value will operate effectively in accordance with the preferred embodiment of the invention is 1.6–4 seconds. The use of the variable timeout will be explained in conjunction with the description of the communication status check module.

Figure 4:
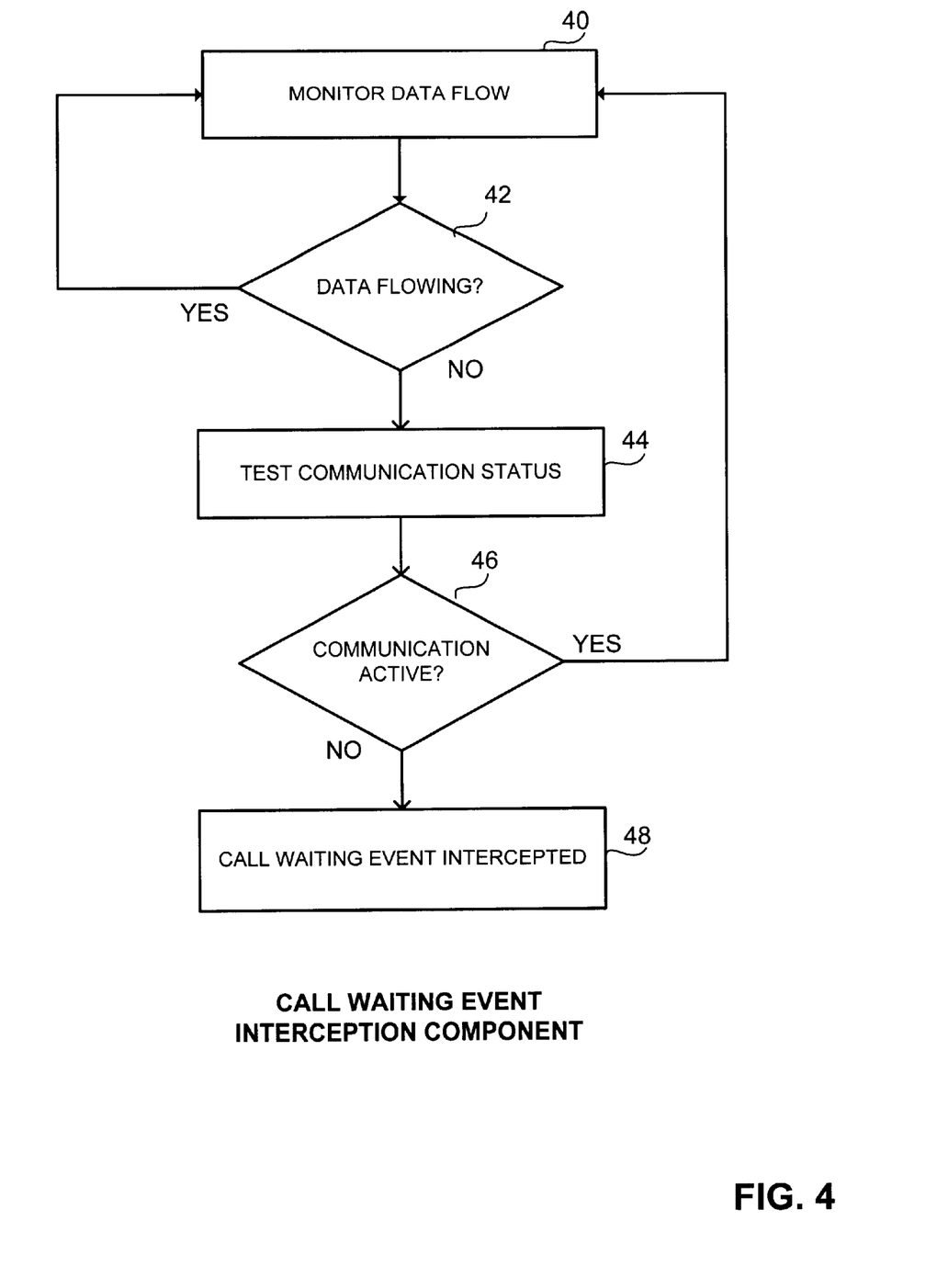
FIG. 4 is a high level flowchart showing the method for intercepting the call-waiting event.

Referring now to FIG. 4 there is shown the operation of the Call-Waiting Event Interception (CWEI) component 26 in FIG. 2. In accordance with the preferred embodiment of the invention CWEI component 26 is constantly monitoring the state of the data flow between the modem 12 and the computer 11 at step 40. The data flow consists of the bytes received from remote modem 17 via the telephone line to modem 12 and transmitted to computer 11. At step 42 CWEI component 26 looks for an interruption in the data flow. As long as the data flow is uninterrupted CWEI component 26 continues monitoring data flow at step 40. When the data flow interrupted CWEI component 26 performs a communication status check at step 44, since the interruption of the data flow does not necessarily means a loss of the signal carrier. Therefore, at step 46 CWEI component 22 inspects the state of the communication. If the communication is active, CWEI component 26 returns monitoring the state of the data flow at step 40. When at step 46 it is resolved that the communication status is inactive it is concluded that a call-waiting event has been detected. CWEI component 26 reports about the event at step 48.

Figure 5:
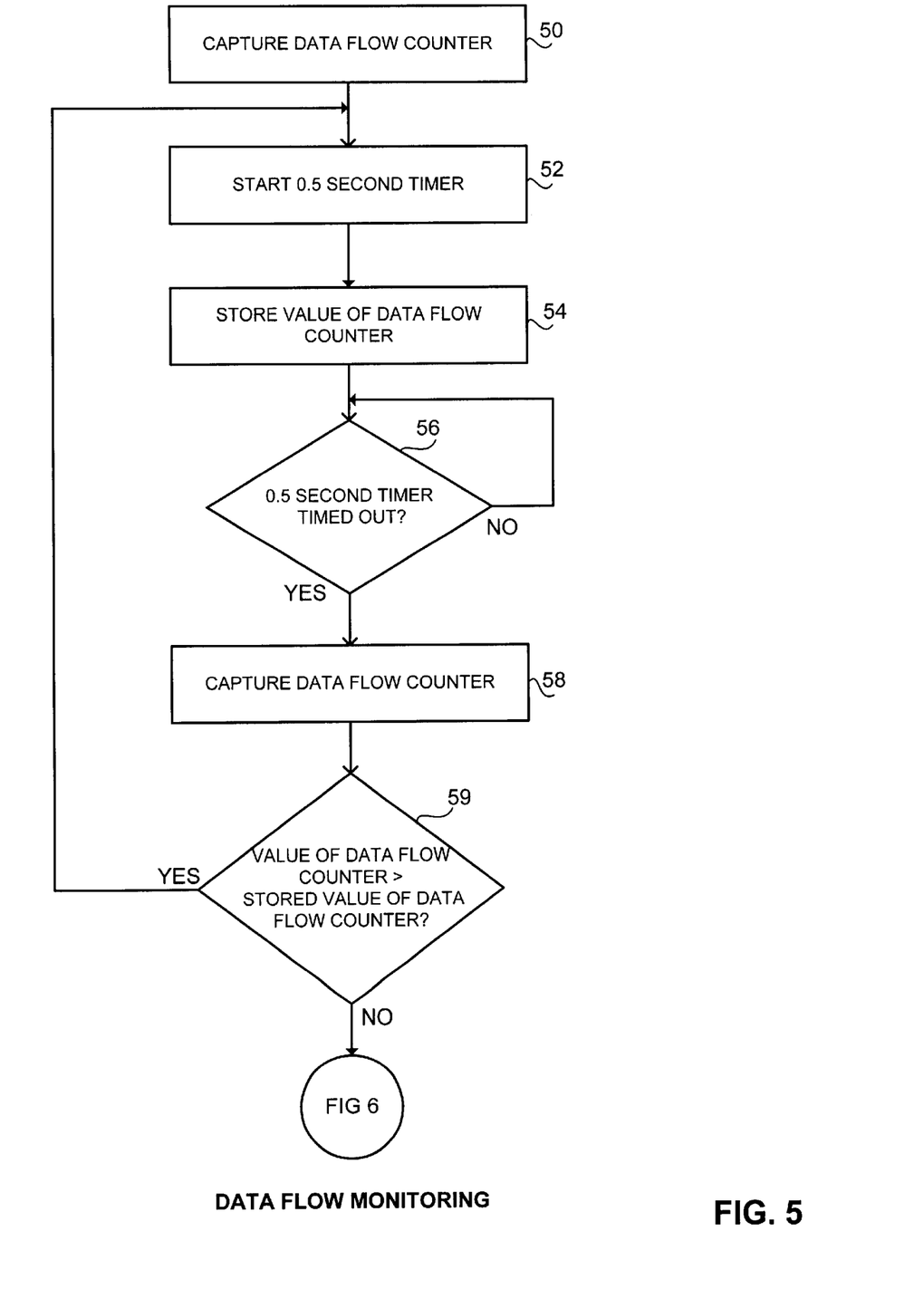
FIG. 5 is a lower level flowchart showing the method for monitoring the data flow.

Referring now to FIG. 5 there illustrated the operation of the CWEI component 26 of FIG. 2 data flow monitoring module 40 in FIG. 4. In accordance with the preferred embodiment of the invention, the data flow between the computer 11 and modem 12 is constantly monitored by CWEI component 26. By monitoring said data flow it may be determined whether interruption in communication occurs and subsequently identifying and intercepting a call-waiting event. The sequence of operations performed by the data flow-monitoring module is described next.

A data flow counter associated with the operating system of the computer holds the accumulated number of bytes that flow between modem 12 and computer 11 during communication of data transfer. The value of the counter is captured at step 50. A timer is started at step 52. The possible range of values across which the timer could effectively operate is 0.2–2.4 seconds. In the preferred embodiment of the present invention, the timer has a value of about 0.5 second. The value of the data flow counter is stored at step 54 and the about 0.5 second timer is inspected at step 56. When the about 0.5 second timer times out data flow counter is captured again at step 58. Next, at step 59 the present value of the data flow counter is compared to the stored value of data flow counter that was stored about 0.5 second previously. If the present value of data flow counter is greater than the stored value of the data flow counter then there was no interruption of the data flow. Therefore, the about 0.5 second timer is started again, at step 52 and the present value of the data flow counter is stored again at step 54.

Otherwise, if the value of the present data flow counter is equal or less to the value of the stored value of the data flow counter then it can be concluded that there was a interruption of the data flow between the modem 12 and the computer 11. There could be a number of reasons for such an interruption and some of said interruptions are normal or ordinary such as a naturally occurring break in the transfer of data combined with temporary inactivity of the user and the like. To determine whether the interruption of the data flow was caused by a loss of the signal carrier, communication status check is applied in FIG. 6.

Figure 6:
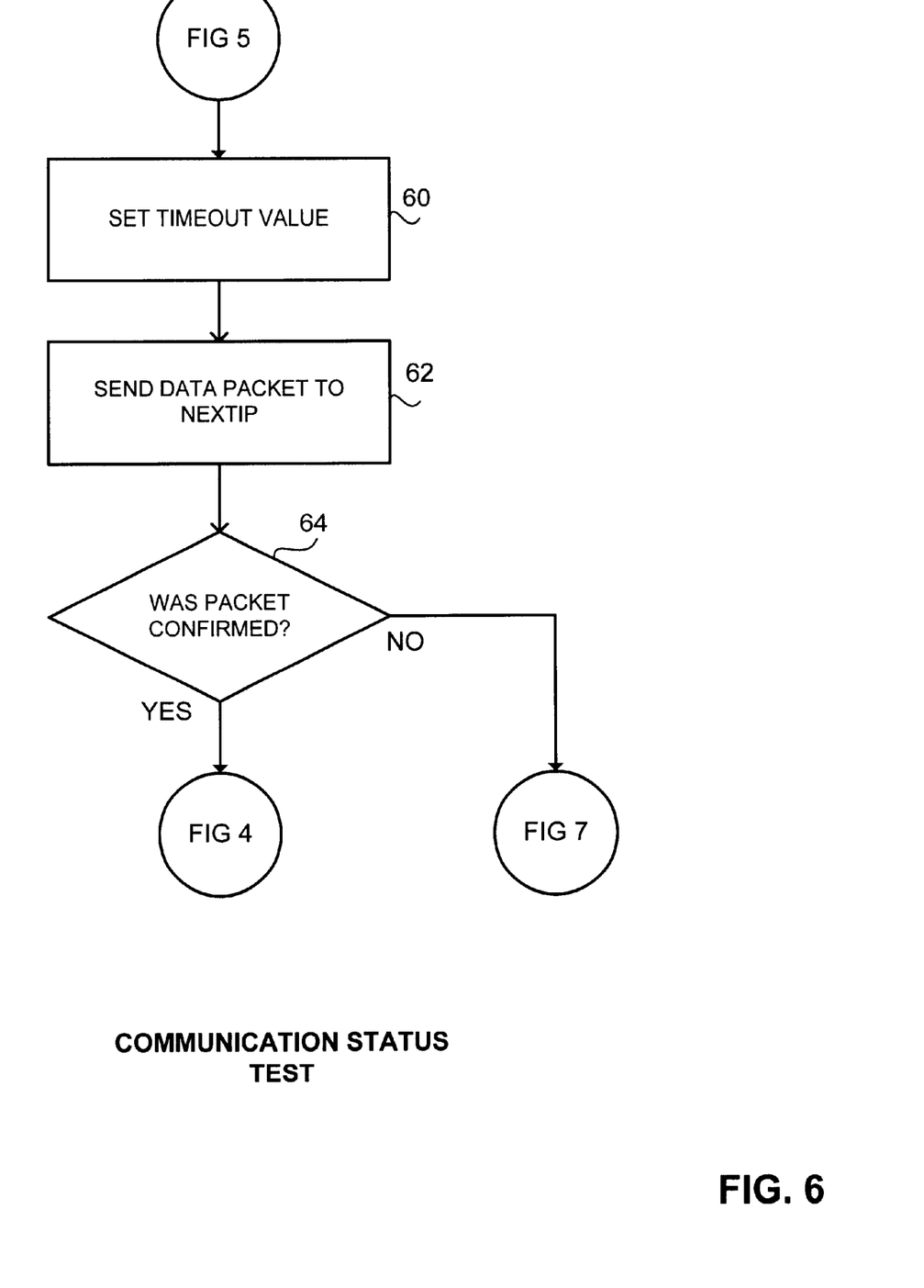
FIG. 6 is a lower level flowchart showing the method for testing the status of the communication.

Referring now to FIG. 6 there is illustrated the operation of the CWEI component 26 of FIG. 2 communication status check module 44 of FIG. 4. In the preferred embodiment of the invention when an interruption is identified in the flow of data between modem 12 and computer 11, control passes to the communication status check module 44 of FIG. 4 from step 59 of FIG. 5. The function of the communication status check module is to check whether the reason for the interruption in the data flow is the loss of the signal carrier.

In a preferred embodiment of the invention at step 60 a timeout variable is set to the value of the average Round Trip Time obtained by the software initialization component 24 of FIG. 2 through the implementation of the Echo function of the ICMP protocol described above in association with FIG. 3B. At step 62 an Internet Protocol (IP) packet is sent to the appropriate software entity of modem 17 of ISP 16 by the Echo function in association with the timeout value. As already described above, ICMP supports an Echo function, operative to send an IP packet on a round-trip between two hosts for various network functions. The purpose of the operation at step 62 is to test the status of the communication. If the communication is active then the IP packet will be echoed back by the software entity of modem 17 according to the ICMP rules within about the time frame of the timeout value. Therefore, confirmation of the sent IP packet is looked for at step 64. If the IP packet is echoed back then it is concluded that the communication is active and the interruption of the data flow was caused by factors unconnected with the loss of signal carrier. Therefore, control is returned to step 50 of FIG. 5 and the monitoring of the data flow resumes as described in association with FIG. 5.

On the other hand if the IP packet sent with the Echo function was not echoed back within the time frame of the timeout value, then loss of signal carrier condition has occurred. Subsequently, if within a predefined number of seconds modem 12 has not retrained successfully (as explained above) and did not re-establish connection with the ISP 16, then it is concluded that a call-waiting event has occurred. Thereupon the user is notified of said event and control passes to said user to use the options thereof.

Figure 7:
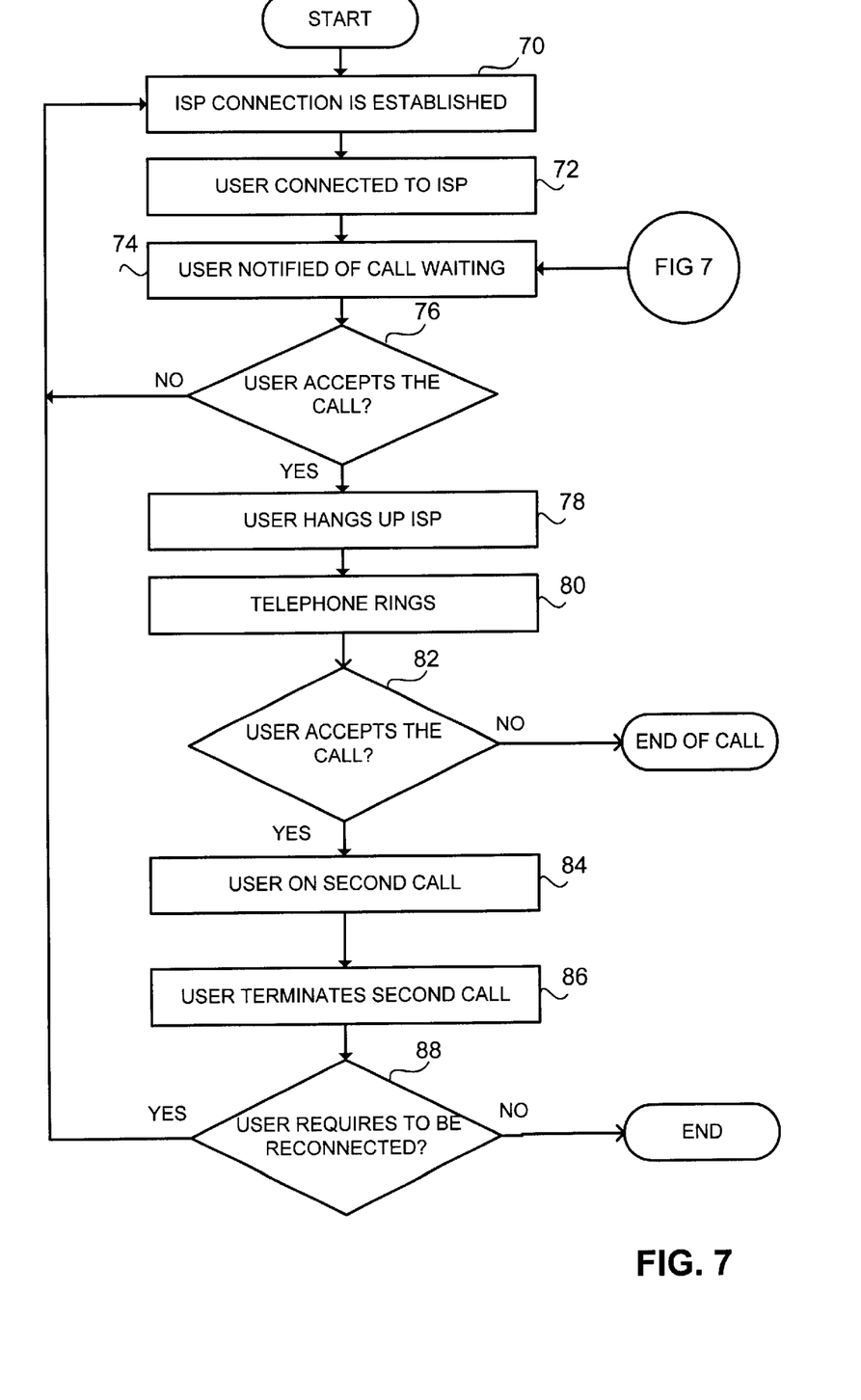
FIG. 7 is a high level flowchart showing the method for handling the call-waiting event.

Referring now to FIG. 7 there is illustrated the handling of the intercepted call-waiting event. After the call-waiting event is identified and intercepted the user is notified of said event and may receive control operative to the management of the call-waiting event.

In a preferred embodiment of the present invention Call-waiting Event Handler 28 of FIG. 2 is activated to assist the user during the call-waiting event handling through methodically notifying the user of the options available thereof at every stage and by executing the instructions thereof. At step 74 of FIG. 4 the user is notified in regard to the call-waiting event. The user takes appropriate actions according to the preferences thereof relating to the options associated with the call-waiting feature. During the handling of the call-waiting event, control passes due to the given circumstances between the user, the call-waiting event handler software and the hardware/software components of the communication environment. The detailed description of the Call-waiting Event Handler 28 of FIG. 2 operation in association with the user's possible actions will be set forth next.

In a preferred embodiment of the invention, call-waiting event is intercepted at step 48 of FIG. 4. In a more detailed description of the call-waiting event interception (CWEI) method at step 64 of FIG. 6 control passes to step 74 of FIG. 7 whereby the user is notified of the call-waiting event.

As a result of the user's instructions ISP 16 connection is established or resumed at step 70 by the communication software of computer 11 and by the modem 12. The user is connected via ISP 16 to the Internet at step 72 and a communication of data transfer will be in progress until a call-waiting event notification is received at step 74 from CWEH component 28 of FIG. 2. The notification and the relevant list of possible reactions thereof could be displayed as formatted text messages on the user's terminal screen or could be communicated to the user in any other format acceptable format in the art. At this point in time, control passes to the user. At step 76 the user decision is monitored whether the second call is accepted thereby. If the second call is not accepted ISP 16 connection is re-established at step 70 and the user is re-connected to the Internet via the ISP 16.

If the user accepts the second call at step 76, instructions related to the required actions are supplied to the user by the CWEH component 28. The instructions could be formatted as text messages on the user's terminal screen or could be formatted in any other acceptable format of the art, such as audible, visual or other indications. Following the instructions the user hangs up the ISP 16 connection at step 78 through the communication software of computer 11 and modem 12. Consequently, due to the telephone company call-waiting feature service, the telephone 13 rings immediately announcing the second call. If the user accepts the call i.e., picks up the telephone 13 handset at step 82 then the second telephone conversation with second caller 14 commences at step 84. The user terminates the second conversation with the second caller 14 at step 86 by hooking on the telephone 13 handset (i.e., hanging up). At step 88 CWEH component 28 inquires the user in regards to possible re-connection to the ISP 16. According to the user instruction ISP 16 connection is established at step 70 by the communication software of computer 11 and by modem 12

From the description above, a number of advantages of the present invention become evident:

The apparatus of the present invention comprises software elements operating in combination with present hardware elements. No hardware modification in the computer or the modem needed for the effective application of the system.

Said software elements are to be installed on the user computer therefore no changes in software or control tables are necessary in telephony, the PSTN, or at the data supplier i.e., the Internet Service Provider (ISP).

All standard modems using AT command are supported.

The invention can also applied to cellular networks using cellular modems.

Although the description above contains many specific details, these not should be construed as limiting the scope of the invention but as merely providing illustrations of the presently preferred embodiment of the invention. For example, the modem discussed could be a cellular modem and the telephone device discussed could be a cellular telephone device.

Persons skilled in the art will appreciate that the present invention is not limited to what has been particularly shown and described hereinabove. Rather the scope of the present invention is defined only by the claims, which follow.

I claim:

1. In a computerized system having a storage device, a communication device, an input/output device and a processing device a call waiting event interception apparatus operatively loaded into said storage device comprising:

a call waiting event interception component for identifying a call waiting event, the call waiting event interception component comprising a communication device initialization component for resetting communication device related values and a computer program initialization component for determining round trip time of a data unit from data network to the system; and a call waiting event handling component.

2. The apparatus of claim 1 wherein the communication device initialization component prevents the communication device from hanging up.

3. The apparatus of claim 1 wherein the communication device is a modem.

4. The apparatus of claim 1 wherein the call waiting interception component comprises a data flow monitoring component for checking the existence of the data flow between the data network and the system.

5. The apparatus of claim 1 wherein the call-waiting event handling component comprises a user interface component for notifying the user as to the call-waiting event.

6. The apparatus of claim 1 wherein the call-waiting event handling component comprises a user interface component for automatically handle the call-waiting event.

7. In a computerized system having a storage device, a communication device, an input/output device and a processing device a call waiting event interception apparatus operatively loaded into said storage device a method for call-waiting interception comprising:

Initializing a communication device;

fixing a reference point on a data network router;

measuring round trip time of a data unit from the system to the referenced router on the network;

identifying a call waiting event; and responding to a call waiting event.

8. The method of claim 7 wherein the step of initializing the communication device comprises activating a computer program designed to connect the system to a data network;

instructing the communication device not to hang up when loss of carrier occurs;

masking when a loss of carrier situation occurs.

9. The method of claim 8 wherein the step of instructing the communication device not to hang up comprises setting the time interval to automatic hang up after loss of carrier in the communication device to a sufficiently high value.

10. The method of claim 8 wherein the step of instructing the communication device not to hang up further comprises setting the time interval to automatic hang up after loss of carrier in the communication device to the highest value.

11. The method of claim 8 wherein the step of instructing the communication device not to hang up further comprises setting the time interval to automatic hang up after loss of carrier in the communication device to a value of 255.

12. The method of claim 8 wherein the step of masking when a loss of carrier situation occurs comprises forcefully setting the communication device to indicate that carrier signal has been detected at all times.

13. The method of claim 8 wherein the step of masking when a loss of carrier situation occurs comprises issuing a command to the communication device indicating that carrier signal has been detected at all times.

14. The method of claim 7 wherein the step of measuring round trip time of a data unit from the data network to the system comprises setting a router as a reference point on the network;

sending a data unit to said router;

measuring the time from sending said data unit until it is returned to system;

calculating the round trip time of said data unit; and setting a timeout value for the round trip time value.

15. The method of claim 7 wherein the step of measuring round trip time of a data unit from the data network to the system employing a message and error control protocol to measure round trip time.

16. The method of claim 14 wherein the data unit sent to the server is an Internet protocol packet.

17. The method of claim 14 wherein the data unit sent to the server size is about 10 percent to about 25 percent of the transmission rate at the time of sending.

18. The method of claim 14 wherein the timeout value of the round trip time value is about 1.3 times of the calculated round trip time.

19. The method of claim 14 wherein the timeout value of the round trip time value is about 1.6 to about 4 seconds.

20. The method of claim 7 wherein the step of identifying a call waiting event comprises:

monitoring the state of data flow between the communication device and the system;

in response to interruption of data flow performing a state of communication check;

determining whether a call waiting event is occurring.

21. The method of claim 20 wherein the step of monitoring comprises:

capturing first data flow counter;

starting a timer set to a predetermined length of time;

storing value of first data flow counter;

capturing second data flow counter when timer has timed out;

restarting said timer set to the same predetermined length of time;

storing value of second data flow counter;

determining whether value of first data flow counter is greater than value of second data flow counter.

22. The method of claim 21 wherein the timer is set from about 0.2 seconds to about 2.4 seconds.

23. The method of claim 21 wherein the timer is set to about 0.5 seconds.

24. The method of claim 20 wherein the step of performing a state of communication check comprises:

setting timeout variable to the value of the round trip time of a data unit;

sending a data unit to host server;

determining if data unit is returned within timeout value.

25. The method of claim 7 wherein the step of responding to a call waiting event comprises notification to the user as to the call-waiting event.

26. The method of claim 7 wherein the step of responding to a call waiting event comprises:

notifying to the user as to the call waiting event;

providing the user control operative to accepting or rejecting the call waiting event.

27. The method of claim 7 wherein the step of responding to a call-waiting event comprises performing user predetermined actions to accept or reject the call-waiting event.

28. The method of claim 7 wherein the step of responding to a call waiting event comprises:

notifying to the user as to the call waiting event;

hanging up connection to data network upon user acceptance of call waiting event;

switching call-waiting to communication device for user to accept or handle.

29. The method of claim 28 further comprising re-establishing connection to data network.

30. The method of claim 7 wherein the step of responding to a call waiting event comprises:

notification to the user as to the call waiting event;

reestablishing connection to data network upon user rejection of call waiting event.

* * * * *